(12) United States Patent
Shibaoka et al.

(10) Patent No.: US 12,311,737 B2
(45) Date of Patent: May 27, 2025

(54) AIR CONDITIONING DEVICE FOR VEHICLE

(71) Applicant: SANDEN CORPORATION, Gunma (JP)

(72) Inventors: Yoshiki Shibaoka, Gunma (JP); Kouhei Yamashita, Gunma (JP); Hongming Zhang, Gunma (JP); Kodai Matsuzaki, Gunma (JP)

(73) Assignee: SANDEN CORPORATION, Gunma (JP)

( * ) Notice: Subject to any disclaimer, the term of this patent is extended or adjusted under 35 U.S.C. 154(b) by 138 days.

(21) Appl. No.: 18/043,990

(22) PCT Filed: Aug. 26, 2021

(86) PCT No.: PCT/JP2021/031286
§ 371 (c)(1),
(2) Date: Mar. 3, 2023

(87) PCT Pub. No.: WO2022/064945
PCT Pub. Date: Mar. 31, 2022

(65) Prior Publication Data
US 2024/0025236 A1 Jan. 25, 2024

(30) Foreign Application Priority Data
Sep. 24, 2020 (JP) ................. 2020-160096

(51) Int. Cl.
*B60H 1/32* (2006.01)
(52) U.S. Cl.
CPC ................. *B60H 1/3205* (2013.01)
(58) Field of Classification Search
CPC ............ B60H 1/00278; B60H 1/00921; B60H 1/00928; B60H 1/00899; B60H 1/32284; B60L 2240/662; B60L 2240/36
See application file for complete search history.

(56) References Cited

U.S. PATENT DOCUMENTS 5,267,443 A * 12/1993 Roehrich .............. F24F 5/0017
62/239
5,518,176 A * 5/1996 Turner ............... B60H 1/00742
236/91 C
(Continued)

FOREIGN PATENT DOCUMENTS

JP 2014-213765 A 11/2014
JP 2020-050155 A 4/2020
(Continued)

OTHER PUBLICATIONS

International Search Report mailed on Nov. 9, 2021 for PCT/JP2021/031286.

*Primary Examiner* — Jianying C Atkisson
*Assistant Examiner* — Meraj A Shaikh
(74) *Attorney, Agent, or Firm* — Rankin, Hill & Clark LLP

(57) ABSTRACT

A control device of a vehicle air-conditioning apparatus has an outside air heat absorption heating mode in which a refrigerant that has been discharged from a compressor and has dissipated heat in a heating unit absorbs heat in an outdoor heat exchanger, and a combined heating mode in which the refrigerant that has been discharged from the compressor and has dissipated heat in the heating unit absorbs heat in the outdoor heat exchanger and a chiller heat exchanger, and upon switching from the combined heating mode to the outside air heat absorption heating mode, performs control in such a manner as to increase a degree of opening of a first electronic expansion valve to a given degree of opening, maintain the given degree of opening for a given period of time, and fully close a second electronic expansion valve within the given period of time.

4 Claims, 11 Drawing Sheets

(56) References Cited

U.S. PATENT DOCUMENTS

| | | | | |
|---|---|---|---|---|
| 5,701,753 | A * | 12/1997 | Iritani | B60H 1/3205 |
| | | | | 62/211 |
| 2010/0326127 | A1* | 12/2010 | Oomura | B60H 1/3208 |
| | | | | 62/498 |
| 2016/0082805 | A1* | 3/2016 | Graaf | B60H 1/04 |
| | | | | 62/238.7 |
| 2016/0121691 | A1* | 5/2016 | Liu | B60H 1/00921 |
| | | | | 62/115 |
| 2016/0185185 | A1 | 6/2016 | Suzuki et al. | |
| 2017/0174038 | A1* | 6/2017 | Scheldel | B60H 1/3213 |
| 2020/0031194 | A1* | 1/2020 | Lee | B60H 1/00278 |
| 2020/0047583 | A1* | 2/2020 | Ishizeki | H01M 10/635 |
| 2020/0086714 | A1* | 3/2020 | Dhar | B60H 1/3227 |
| 2021/0323380 | A1 | 10/2021 | Ishizeki et al. | |

FOREIGN PATENT DOCUMENTS

| | | | |
|---|---|---|---|
| WO | 2020/066719 | A1 | 4/2020 |
| WO | 2020/129494 | A1 | 6/2020 |

\* cited by examiner

AIR CONDITIONING DEVICE FOR VEHICLE

TECHNICAL FIELD

The present invention relates to a heat pump vehicle air-conditioning apparatus, and particularly to a vehicle air-conditioning apparatus capable of heating the interior of a vehicle by absorbing heat from temperature control targets such as a battery and a motor that are mounted on the vehicle.

BACKGROUND ART

In recent years, vehicles such as hybrid vehicles and electric vehicles that drive a motor for traveling with electric power supplied from a battery mounted on the vehicle have become widespread. As an air-conditioning apparatus applied to such vehicles, an air-conditioning apparatus is known which includes a refrigerant circuit in which a compressor that compresses and discharges a refrigerant, an indoor condenser (radiator) that is provided inside the vehicle and causes the refrigerant to dissipate heat, and an outdoor heat exchanger that is provided outside the vehicle to let outside air thereinto and to cause the refrigerant to absorb or dissipate heat t are connected (for example, Patent Literature 1). Such a vehicle air-conditioning apparatus, for example, performs heating by causing the refrigerant that has been discharged from the compressor and has dissipated heat in the indoor condenser to absorb heat in the outdoor heat exchanger, and performs cooling by causing the refrigerant that has been discharged from the compressor and has dissipated heat in the outdoor heat exchanger to evaporate in a heat sink (evaporator) to absorb heat, thereby conditioning the air in the vehicle.

Moreover, for example, a vehicle air-conditioning apparatus is known which includes a refrigerant circuit provided with a temperature control target-specific heat exchanger that cools a temperature control target such as a battery and which switches between an outside air heat absorption heating mode in which only an outdoor heat exchanger causes a refrigerant to absorb heat during heating operation, a temperature control target-specific heat exchanger heating mode in which only the temperature control target-specific heat exchanger causes the refrigerant to absorb heat during the heating operation, and a combined heating mode in which both of the outdoor heat exchanger and the temperature control target-specific heat exchanger cause the refrigerant to absorb heat during the heating operation, and executes the mode (for example, Patent Literature 2). These modes are switched by dividing the refrigerant, and adjusting the amount of the divided flow, by use of an electronic expansion valve provided on a refrigerant inlet side of the outdoor heat exchanger and an electronic expansion valve provided before a refrigerant inlet of the temperature control target-specific heat exchanger.

CITATION LIST

Patent Literature

Patent Literature 1: JP-A-2014-213765
Patent Literature 2: JP-A-2020-050155

SUMMARY OF INVENTION

Problems to be Solved by Invention

In the vehicle air-conditioning apparatus described above, when the heating operation in the temperature control target-specific heat exchanger heating mode or the combined heating mode is switched to the heating operation in the outside air heat absorption heating mode, the electronic expansion valve (hereinafter referred to as the "chiller expansion valve") provided on the refrigerant inlet side of the temperature control target-specific heat exchanger is fully closed immediately.

However, if the chiller expansion valve is fully closed immediately, a flow path of the refrigerant discharged from the indoor condenser, the flow path leading to the temperature control target-specific heat exchanger, is blocked suddenly, and the refrigerant stops flowing to the temperature control target-specific heat exchanger. Therefore, the outlet pressure and the subcooling (SC) value of the indoor condenser increase suddenly and temporarily. In such a case, for example, there are concerns about deterioration in controllability of high pressure in the compressor, failure and durability decrease of the compressor, and deterioration in controllability of subcooling in the electronic expansion valve provided to a refrigerant pipe leading to the outdoor heat exchanger.

The present invention has been made considering such circumstances, and an object thereof is, for example, to prevent sudden increases in the refrigerant outlet pressure and the SC value of a heating unit at the time of switching the heating modes.

Solution to Problems

The present invention provides a vehicle air-conditioning apparatus for conditioning air in a vehicle, the vehicle air-conditioning apparatus including: a refrigerant circuit having: a compressor configured to compress a refrigerant; a heating unit configured to heat blowing air to be blown into an air-conditioning target space; an outdoor heat exchanger configured to cause the refrigerant to absorb heat; a first electronic expansion valve provided on a refrigerant inlet side of the outdoor heat exchanger; a temperature control target heat exchanger; and a second electronic expansion valve provided on a refrigerant inlet side of the temperature control target heat exchanger; a device temperature adjustment circuit connected to the refrigerant circuit via the temperature control target heat exchanger and configured to cause the temperature control target heat exchanger to adjust the temperature of a temperature control target mounted on a vehicle; and a control device configured to control the refrigerant circuit and the device temperature adjustment circuit, in which the control device, in a heating operation for heating the interior of the vehicle by use of the heating unit, has at least an outside air heat absorption heating mode in which the refrigerant that has been discharged from the compressor and has dissipated heat in the heating unit absorbs heat in the outdoor heat exchanger, and a combined heating mode in which the refrigerant that has been discharged from the compressor and has dissipated heat in the heating unit absorbs heat in the outdoor heat exchanger and the temperature control target heat exchanger, and upon switching from the combined heating mode to the outside air heat absorption heating mode, performs control in such a manner as to increase the degree of opening of the first electronic expansion valve to a given degree of opening, maintain the given degree of opening for a given period of time, and fully close the second electronic expansion valve within the given period of time.

Effects of Invention

According to the present invention, it is possible to prevent sudden increases in the refrigerant outlet pressure and the SC value of a heating unit at the time of switching heating modes.

DESCRIPTION OF EMBODIMENTS

Figure 1:
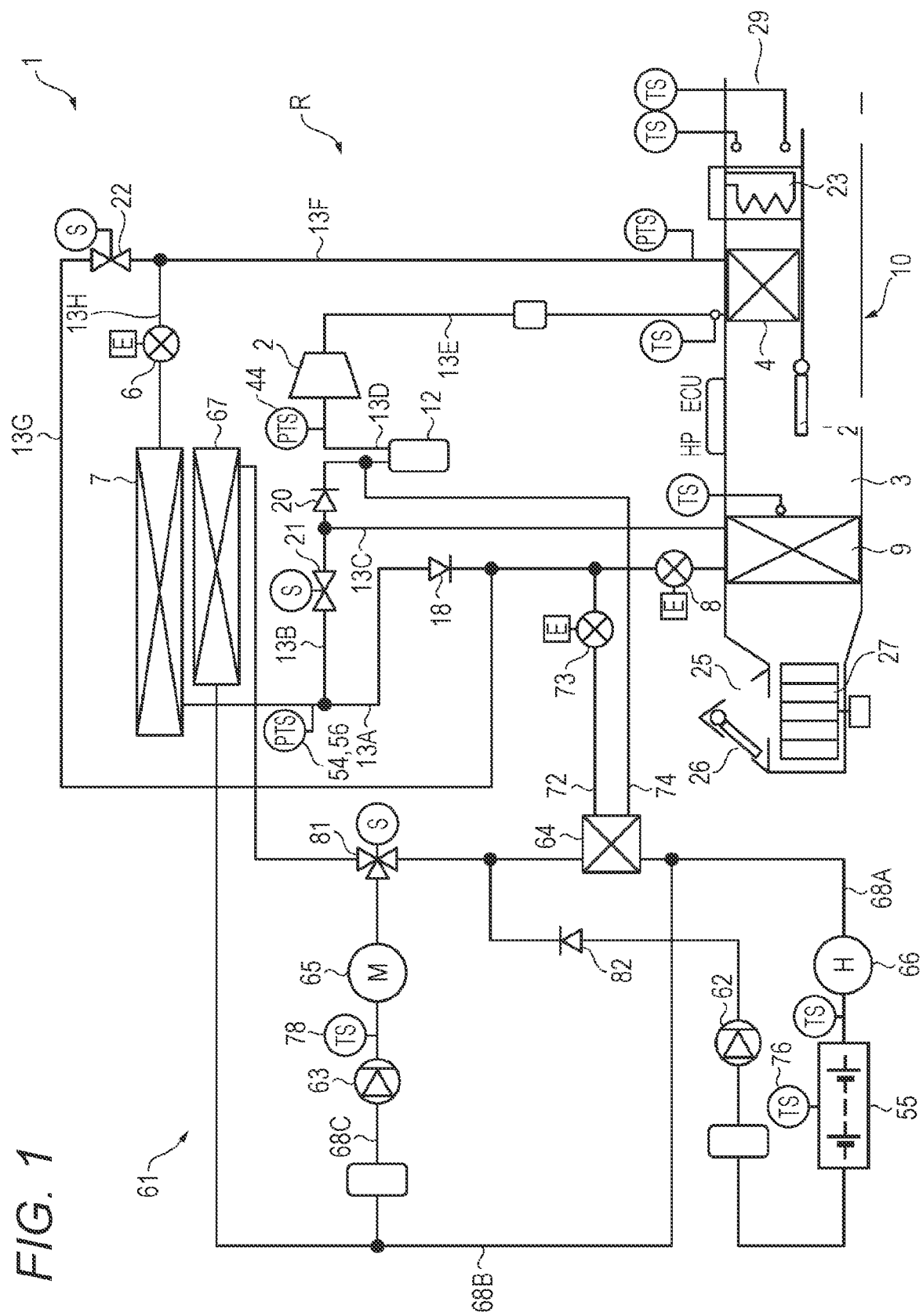
FIG. 1 is a diagram illustrating a schematic configuration of a vehicle air-conditioning apparatus according to an embodiment of the present invention.

A mode for carrying out the present invention is described in detail hereinafter with reference to the drawings. In the following description, the same reference signs denote portions of the same functions, and redundant descriptions in the drawings are omitted as appropriate.

FIG. 1 illustrates a schematic configuration of a vehicle air-conditioning apparatus 1 according to an embodiment of the present invention. The vehicle air-conditioning apparatus 1 can be applied to vehicles such as an electric vehicle (EV) where an engine (internal combustion engine) is not mounted and what is called a hybrid vehicle that uses an engine and an electric motor for traveling. Such a vehicle is mounted with a battery 55 (for example, a lithium battery), and is driven and travels by supplying electric power charged in the battery 55 from an external power source, to a motor unit 65 including a motor for traveling (an electric motor). The vehicle air-conditioning apparatus 1 is also driven by the power supplied from the battery 55.

The vehicle air-conditioning apparatus 1 includes a refrigerant circuit R for performing heat pump operation, and a device temperature adjustment circuit 61 that adjusts the temperatures of temperature control targets such as the battery 55 and the motor unit 65. The device temperature adjustment circuit 61 is a parallel circuit to the refrigerant circuit R via a refrigerant-heating medium heat exchanger 64 described below. The vehicle air-conditioning apparatus 1 selectively executes various operation modes including air-conditioning operation such as heating operation and cooling operation based on the heat pump operation that uses the refrigerant circuit R to condition air in a vehicle and control the temperatures of the temperature control targets such as the battery 55 and the motor unit 65.

The refrigerant circuit R is configured in such a manner that, for example, a motor-driven compressor (electric compressor) 2 that compresses a refrigerant, an indoor condenser 4 as an indoor heat exchanger (heating unit) that is provided in an air circulation path 3 of an HVAC unit 10 through which the vehicle is ventilated and the air in the vehicle interior is circulated, dissipates heat from the high-temperature, high-pressure refrigerant discharged from the compressor 2, and heats the air to be supplied to the vehicle interior, an outdoor expansion valve (first electronic expansion valve) 6 that decompresses and expands the refrigerant during heating, an outdoor heat exchanger 7 for exchanging heat between the refrigerant and outside air to function as a radiator (condenser) that causes the refrigerant to dissipate heat during cooling and to function as an evaporator that causes the refrigerant to absorb heat during heating, an indoor expansion valve 8 that decompresses and expands the refrigerant, a heat sink 9 provided in the air circulation path 3 to cause the refrigerant to absorb heat from the interior or exterior of the vehicle and then cool the air to be supplied to the vehicle interior during cooling (during dehumidification), and an accumulator 12 are connected by refrigerant pipes 13A to 13H.

Each of the outdoor expansion valve 6 and the indoor expansion valve 8 is an electronic expansion valve that is driven by an unillustrated pulse motor. The degree of opening of each of the outdoor expansion valve 6 and the indoor expansion valve 8 is controlled between a fully closed position and a fully open position as appropriate, depending on the number of pulses applied to the pulse motor. The outdoor expansion valve 6 decompresses and expands the refrigerant that flows out of the indoor condenser 4 and flows into the outdoor heat exchanger 7. Moreover, during the heating operation using the outdoor heat exchanger 7, an air-conditioning controller 32 described below controls the degree of opening of the outdoor expansion valve 6 in such a manner that a subcooling (SC) value, which is a measure of the degree of achievement of subcooling at a refrigerant outlet of the indoor condenser 4, reaches a predetermined target value (SC control). The indoor expansion valve 8 decompresses and expands the refrigerant flowing into the heat sink 9, and adjusts the heat absorption amount of the refrigerant, that is, the cooling capacity of the passing air, of the heat sink 9.

A refrigerant outlet of the outdoor heat exchanger 7 and a refrigerant inlet of the heat sink 9 are connected by the refrigerant pipe 13A. The refrigerant pipe 13A is provided with a check valve 18 and the indoor expansion valve 8 sequentially from the outdoor heat exchanger 7. The check valve 18 is provided to the refrigerant pipe 13A in such a manner that a direction pointing to the heat sink 9 is a forward direction. The refrigerant pipe 13A branches to the refrigerant pipe 13B at a position closer to the outdoor heat exchanger 7 than the check valve 18 is.

The refrigerant pipe 13B that branches from the refrigerant pipe 13A is connected to a refrigerant inlet of the accumulator 12. The refrigerant pipe 13B is provided with a solenoid valve 21 and a check valve 20 that are open during heating, sequentially from the outdoor heat exchanger 7. The check valve 20 is connected in such a manner that a direction pointing to the accumulator 12 is a forward direction. The refrigerant pipe 13B branches to the refrigerant pipe 13C at some point between the solenoid valve 21 and the check valve 20. The refrigerant pipe 13C that branches from the refrigerant pipe 13B is connected to a refrigerant outlet of the heat sink 9. A refrigerant outlet of the accumulator 12 and the compressor 2 are connected by the refrigerant pipe 13D.

A refrigerant outlet of the compressor 2 and a refrigerant inlet of the indoor condenser 4 are connected by the refrigerant pipe 13E. One end of the refrigerant pipe 13F is connected to the refrigerant outlet of the indoor condenser 4, and the other end of the refrigerant pipe 13F branches into the refrigerant pipes 13G and 13H before (on a refrigerant upstream side of) the outdoor expansion valve 6. The refrigerant pipe 13H, which is one of the branches, is connected to a refrigerant inlet side of the outdoor heat exchanger 7 via the outdoor expansion valve 6. Moreover, the refrigerant pipe 13G, which is the other branch, is connected between the check valve 18 and the indoor expansion valve 8 of the refrigerant pipe 13A. A solenoid valve 22 is provided on a refrigerant upstream side of the connection point of the refrigerant pipe 13G with the refrigerant pipe 13A.

Consequently, the refrigerant pipe 13G is connected in parallel to a series circuit including the outdoor expansion valve 6, the outdoor heat exchanger 7, and the check valve 18, and serves as a circuit that bypasses the outdoor expansion valve 6, the outdoor heat exchanger 7, and the check valve 18.

In the air circulation path 3 on an air upstream side of the heat sink 9, inlets of an outside air inlet and an inside air inlet are formed (FIG. 1 illustrates an inlet 25 as a representative). The inlet 25 is provided with an intake switching damper 26. The intake switching damper 26 switches between inside air that is the air in the vehicle (inside air recirculation) and outside air that is the air outside the vehicle (outside air introduction) as appropriate to introduce the air into the air circulation path 3 from the inlet 25. An indoor fan (blower fan) 27 for supplying the introduced inside air or outside air to the air circulation path 3 is provided on an air downstream side of the intake switching damper 26.

In FIG. 1, a reference sign 23 denotes an auxiliary heater as an auxiliary heating device. The auxiliary heater 23 includes, for example, a PTC heater (electric heater), and is provided in the air circulation path 3 on an air downstream side of the indoor condenser 4 relative to the air flow in the air circulation path 3. When the auxiliary heater 23 is energized to generate heat, it serves as what is called a heater core and complements heating in the vehicle.

An air mixing damper 28 that adjusts the ratio of air (inside air or outside air) in the air circulation path 3 that has flowed into the air circulation path 3 and has passed through the heat sink 9 to be let into the indoor condenser 4 and the auxiliary heater 23 is provided in the air circulation path 3 on an air upstream side of the indoor condenser 4.

Note that in addition to the indoor condenser, the heating unit can also take, for example, a form in which hot water heated by compressor waste heat is circulated to the heater core to heat blowing air.

The device temperature adjustment circuit 61 circulates a heating medium to the temperature control targets such as the battery 55 and the motor unit 65 to adjust the temperatures of the battery 55 and the motor unit 65. Note that the motor unit 65 also includes heat generating devices such as an electric motor for traveling and an inverter circuit that drives an electric motor. In addition to the battery 55 and the motor unit 65, a device that is mounted on the vehicle and generates heat can be applied as the temperature control target.

The device temperature adjustment circuit 61 includes a first circulation pump 62 and a second circulation pump 63 as circulation devices for circulating the heating medium to the battery 55 and the motor unit 65, the refrigerant-heating medium heat exchanger (hereinafter referred to as the "chiller heat exchanger" 64, a heating medium heater 66, an air-heating medium heat exchanger 67, and a three-way valve 81 as a flow path switching device.

The device temperature adjustment circuit 61 is connected to the refrigerant circuit R via the chiller heat exchanger 64. In the refrigerant circuit R, one end of a branch pipe 72 as a branch circuit is connected between the connection point of the refrigerant pipe 13A with the refrigerant pipe 13G and the indoor expansion valve 8, and the other end of the branch pipe 72 is connected to a refrigerant flow path of the chiller heat exchanger 64. The branch pipe 72 is provided with a chiller expansion valve (second electronic expansion valve) 73. The chiller expansion valve 73 is an electronic expansion valve that is driven by an unillustrated pulse motor. The degree of opening is controlled between a fully closed position and a fully open position as appropriate, depending on the number of pulses applied to the pulse motor. The chiller expansion valve 73 decompresses and expands the refrigerant that flows into the refrigerant flow path of the chiller heat exchanger 64.

One end of a refrigerant pipe 74 is connected to an outlet of the refrigerant flow path of the chiller heat exchanger 64, and the other end of the refrigerant pipe 74 is connected between the check valve 20 of the refrigerant pipe 13B and the accumulator 12. The chiller heat exchanger 64 constitutes a part of the refrigerant circuit R and also constitutes a part of the device temperature adjustment circuit 61.

One end of a heating medium pipe 68A is connected to a heating medium discharge side of the chiller heat exchanger 64. The heating medium pipe 68A is provided with the heating medium heater 66, the battery 55, the first circulation pump 62, and a check valve 82 sequentially from the chiller heat exchanger 64. The other end of the heating medium pipe 68A is connected to a heating medium pipe 68B described below. The heating medium pipe 68A branches to the heating medium pipe 68B in a position closer to the chiller heat exchanger 64 than the heating medium heater 66 is. The other end of the branched heating medium pipe 68B is connected to a heating medium inlet of the chiller heat exchanger 64. The heating medium pipe 68B is provided with the air-heating medium heat exchanger 67. The air-heating medium heat exchanger 67 is placed on a leeward side of the outdoor heat exchanger 7 relative to the flow (air course) of outside air (air) to be let in by an unillustrated outdoor fan.

The three-way valve 81 is provided on a heating medium downstream side of the air-heating medium heat exchanger 67 of the heating medium pipe 68B, and the other end of the heating medium pipe 68A is connected between the three-way valve 81 of the heating medium pipe 68B and the heating medium inlet of the chiller heat exchanger 64. The heating medium pipe 68B branches to a heating medium pipe 68C on a heating medium upstream side of the air-heating medium heat exchanger 67 of the heating medium pipe 68B, and the other end of the branched heating medium pipe 68C is connected to the three-way valve 81. The heating medium pipe 68C is provided with the second circulation pump 63 and the motor unit 65.

As the heating medium used in the device temperature adjustment circuit 61, for example, water, a refrigerant such as HFO-1234yf, a liquid such as a coolant, or a gas such as air can be adopted. Note that in the embodiment, water is adopted as the heating medium. Moreover, it is assumed that, for example, a jacket structure in which the heating medium can circulate in heat exchange relationship with the battery 55 and the motor unit 65 is provided around the battery 55 and the motor unit 65.

When the three-way valve 81 is switched to a state of causing the inlet and the outlet closer to the chiller heat exchanger 64 to communicate with each other, and the second circulation pump 63 is operated, the heating medium discharged from the second circulation pump 63 flows through the heating medium pipe 68C, the motor unit 65, the three-way valve 81, the heating medium pipe 68B, a heating medium flow path of the chiller heat exchanger 64, and the heating medium pipe 68B in this order, and is sucked into the second circulation pump 63. In such a flow path controlled state, the heating medium is circulated between the motor unit 65 and the chiller heat exchanger 64.

When the chiller expansion valve 73 is open, a part or all of the refrigerant that has flowed out of the refrigerant pipe 13G and the outdoor heat exchanger 7 flows into the branch pipe 72, is decompressed by the chiller expansion valve 73, and then flows into the refrigerant flow path of the chiller heat exchanger 64 to evaporate. The refrigerant absorbs heat from the heating medium flowing through the heating medium flow path in the course of flowing through the refrigerant flow path of the chiller heat exchanger 64, and then is sucked into the compressor 2 through the accumulator 12.

Figure 2:
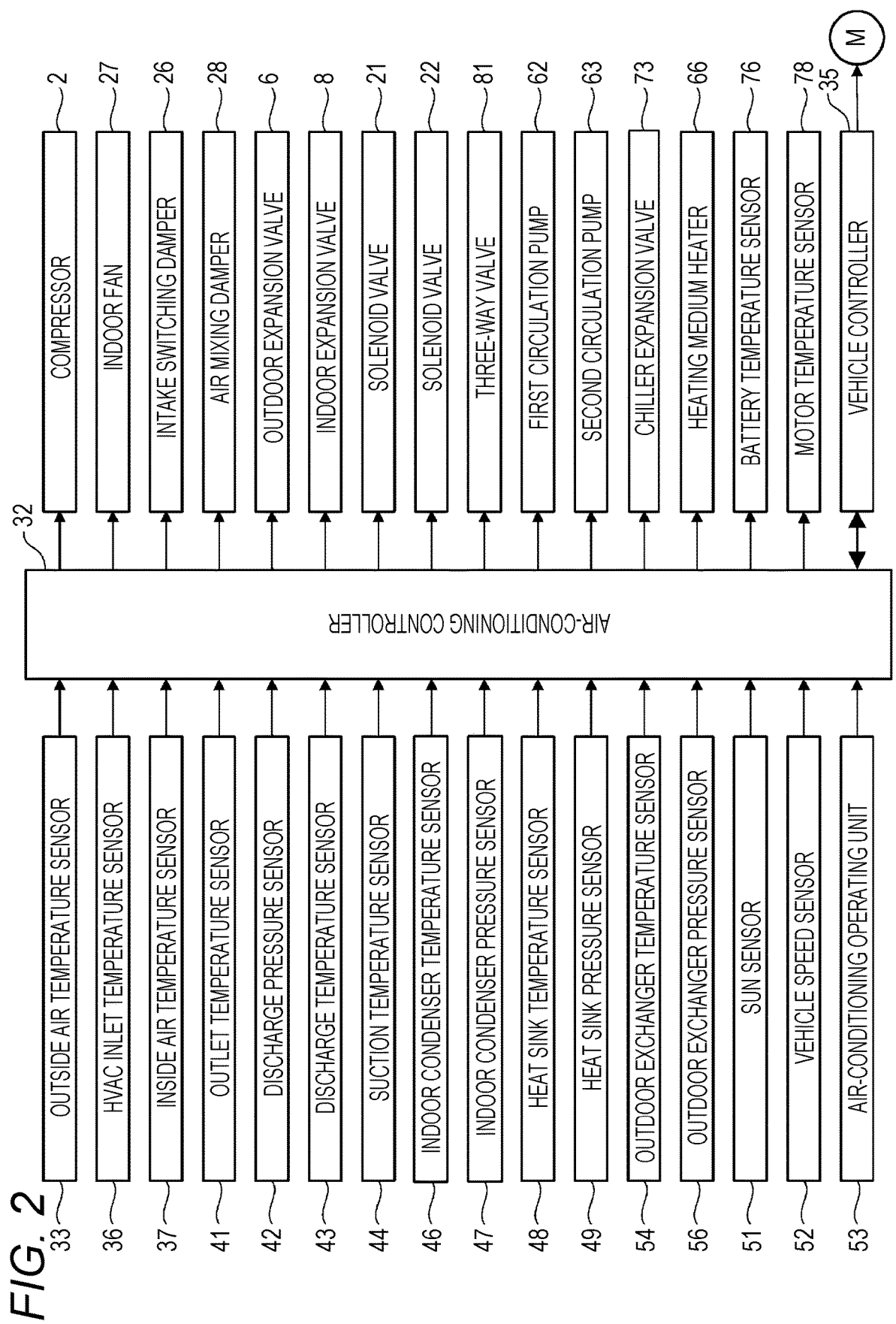
FIG. 2 is a block diagram illustrating a schematic configuration of an air-conditioning controller as a control device of the vehicle air-conditioning apparatus according to the embodiment of the present invention.

FIG. 2 illustrates a schematic configuration of the air-conditioning controller 32 as a control device that is responsible for controlling the vehicle air-conditioning apparatus 1. The air-conditioning controller 32 is connected via a vehicle communication bus to a vehicle controller 35 (an ECU) that is responsible for overall vehicle control including drive control over the motor unit 65 and charge/discharge control over the battery 55, and transmits and receives information. A microcomputer as an example of a computer including a processor can be applied to each of the air-conditioning controller 32 and the vehicle controller 35 (the ECU).

The following sensors and detectors are connected to the air-conditioning controller 32 (the control device), and outputs of these sensors, detectors, and the like are inputted into the air-conditioning controller 32. In other words, the air-conditioning controller 32 (the control device) is connected to an outside air temperature sensor 33 that detects the temperature (Tam) of the air outside the vehicle, an HVAC inlet temperature sensor 36 that detects the temperature of the air to be sucked into the air circulation path 3 from the inlet 25, an inside air temperature sensor 37 that detects the temperature of the air inside the vehicle (inside air), an outlet temperature sensor 41 that detects the temperature of the air to be blown into the vehicle interior from an outlet 29, a discharge pressure sensor 42 that detects the refrigerant discharge pressure (a discharge pressure Pd) of the compressor 2, a discharge temperature sensor 43 that detects the refrigerant discharge temperature of the compressor 2, a suction temperature sensor 44 that detects a refrigerant suction temperature TS of the compressor 2, an indoor condenser temperature sensor 46 that detects the temperature of the indoor condenser 4 (the temperature of the refrigerant that has passed through the indoor condenser 4, or the temperature of the indoor condenser 4 itself: an indoor condenser temperature TCI), and an indoor condenser pressure sensor 47 that detects the pressure of the indoor condenser 4 (in the embodiment, the pressure of the refrigerant immediately after exiting from the indoor condenser 4: an indoor condenser outlet pressure Pci), a heat sink temperature sensor 48 that detects the temperature of the heat sink 9 (the temperature of the air that has passed through the heat sink 9, or the temperature of the heat sink 9 itself: a heat sink temperature Te), a heat sink pressure sensor 49 that detects the refrigerant pressure of the heat sink 9 (the pressure of the refrigerant in the heat sink 9, or the pressure of the refrigerant immediately after exiting from the heat sink 9), a sun sensor 51 of, for example, a photosensor type for detecting the amount of solar radiation to the vehicle interior, a vehicle speed sensor 52 for detecting the travel speed of the vehicle (a vehicle speed), an air-conditioning operating unit 53 for setting the switching of a set temperature and air-conditioning operation, an outdoor heat exchanger temperature sensor 54 that detects the temperature of the outdoor heat exchanger 7 (in the embodiment, a refrigerant discharge temperature TXO immediately after the discharge from the outdoor heat exchanger 7), and an outdoor heat exchanger pressure sensor 56 that detects the refrigerant pressure of the outdoor heat exchanger 7 (in the embodiment, a refrigerant discharge pressure value PXO immediately after the discharge from the outdoor heat exchanger 7).

In addition to the above sensors and unit, the air-conditioning controller 32 is also connected to a battery temperature sensor 76 that detects the temperature of the battery 55

(any of the temperature of the battery 55 itself, the temperature of the heating medium that has exited from the battery 55, and the temperature of the heating medium that enters the battery 55: a battery temperature Tb), a heating medium outlet temperature sensor that detects the temperature of the heating medium that has exited from the heating medium flow path of the chiller heat exchanger 64, and a motor temperature sensor 78 that detects the temperature of the motor unit 65 (any of the temperature of the motor unit 65 itself, the temperature of the heating medium that has exited from the motor unit 65, and the temperature of the heating medium that enters the motor unit 65: a motor temperature Tw).

On the other hand, the output side of the air-conditioning controller 32 is connected to the compressor 2, the outdoor fan, the indoor fan (blower fan) 27, the intake switching damper 26, the air mixing damper 28, an outlet switching damper 31, the outdoor expansion valve 6, the indoor expansion valve 8, the solenoid valves including the solenoid valves 21 and 22, the auxiliary heaters 23, the first and second circulation pumps 62 and 63, the chiller expansion valve 73, and the three-way valve 81. The air-conditioning controller 32 controls these components on the basis of the output of each sensor, settings inputted by the air-conditioning operating unit 53, and information from the vehicle controller 35.

The operation of the vehicle air-conditioning apparatus 1 configured in this manner, particularly, operation during the heating operation is described below. In the heating operation, the air-conditioning controller 32 (the control device) according to the embodiment can switch between three modes: an outside air heat absorption heating mode in which only the outdoor heat exchanger 7 absorbs heat (a normal heating mode), a combined heating mode in which the outdoor heat exchanger 7 and the chiller heat exchanger 64 absorb heat (a waste heat recovery parallel mode), and a temperature control target heat absorption heating mode in which only the chiller heat exchanger 64 absorbs heat (a waste heat recovery single mode), and executes the mode. Each heating mode is described below.

(1) Outside Air Heat Absorption Heating Mode (Normal Heating Mode)

Figure 3:
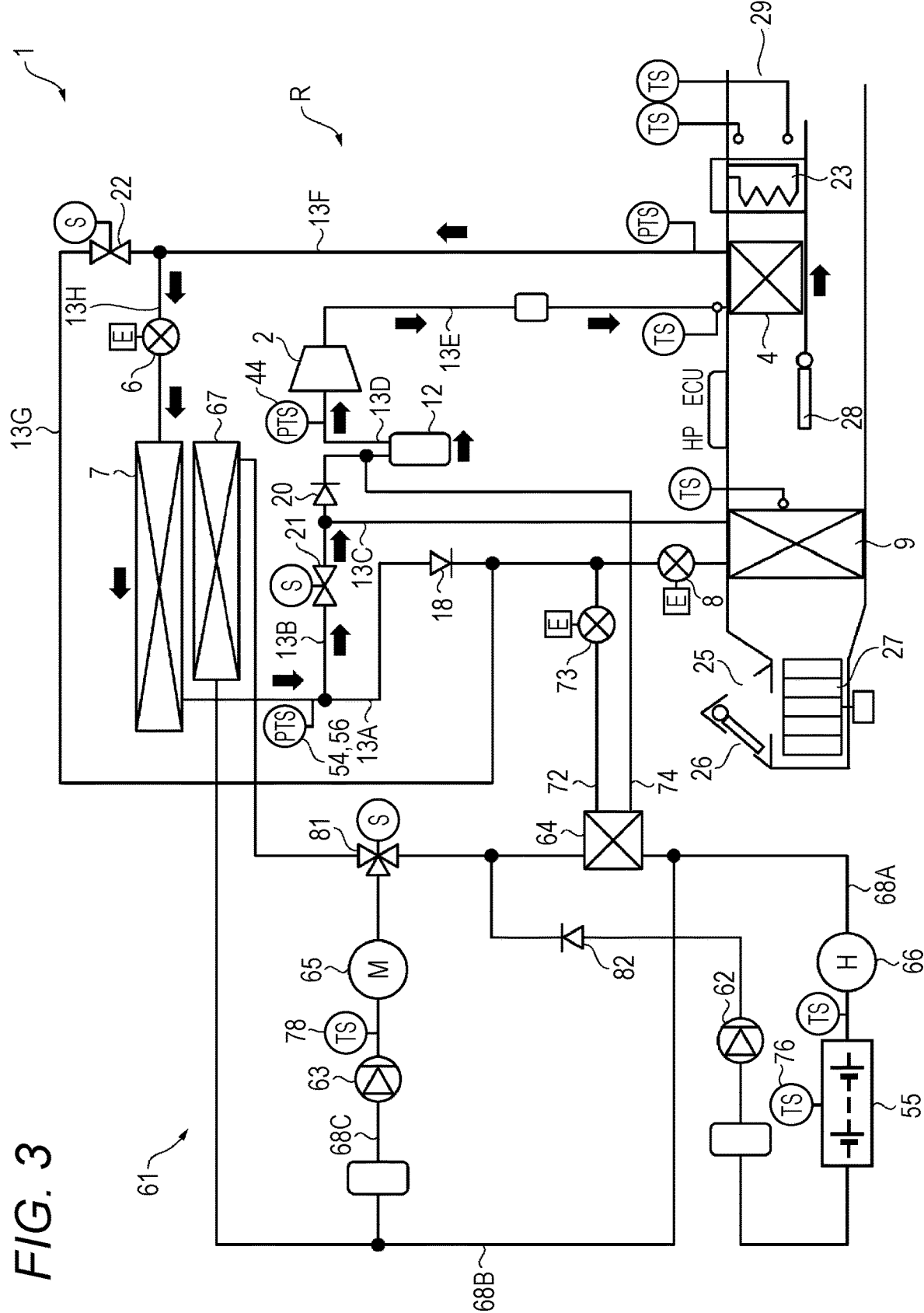
FIG. 3 is an explanatory diagram illustrating the flow of a refrigerant during heating operation in an outside air heat absorption heating mode in the vehicle air-conditioning apparatus according apparatus to the embodiment of the present invention.

FIG. 3 illustrates the flow (solid arrows) of the refrigerant in the refrigerant circuit R in the outside air heat absorption heating mode. When the heating operation is selected by the air-conditioning controller 32 (an auto mode), or by a manual operation on the air-conditioning operating unit 53 (a manual mode), and the air-conditioning controller 32 executes the outside air heat absorption heating mode, the solenoid valve 21 (for heating) is opened and the indoor expansion valve 8 is fully closed. Moreover, the chiller expansion valve 73 is fully closed, and the solenoid valve 22 (for dehumidification) is also closed.

The compressor 2 and the fan 27 are operated, and the air mixing damper 28 is enabled to adjust the ratio of the air blown out from the indoor fan 27 to be let into the indoor condenser 4 and the auxiliary heater 23. Consequently, the high-temperature, high-pressure gas refrigerant discharged from the compressor 2 flows into the indoor condenser 4. Since the air in the air circulation path 3 is let into the indoor condenser 4, the air in the air circulation path 3 is heated by the high-temperature refrigerant in the indoor condenser 4, whereas the refrigerant in the indoor condenser 4 loses heat due to the air, is cooled, condensed, and liquefied.

The refrigerant liquefied in the indoor condenser 4 exits from the indoor condenser 4, and then reaches the outdoor expansion valve 6 through the refrigerant pipes 13F and 13H. The refrigerant is decompressed by the outdoor expansion valve 6 and then flows into the outdoor heat exchanger 7. The refrigerant that has flowed into the outdoor heat exchanger 7 evaporates and pumps (absorbs) heat from the outside air that flows in while driving, or from the outside air that is let in by the outdoor fan (not illustrated). In other words, the refrigerant circuit R serves as a heat pump.

The low-temperature refrigerant that has exited from the outdoor heat exchanger 7 flows into the accumulator 12 through the refrigerant pipe 13A, the refrigerant pipe 13B, the solenoid valve 21, and the check valve 20. After the refrigerant is separated into gas and liquid in the accumulator 12, the gas refrigerant is sucked into the compressor 2 through the refrigerant pipe 13D. This circulation is repeated. The air heated in the indoor condenser 4 is blown out through the outlet 29. Consequently, the vehicle interior is heated.

The air-conditioning controller 32 calculates a target indoor condenser pressure PCO (a target value of the pressure Pci of the indoor condenser 4) from a target heater temperature TCO (a target value of the temperature of the air on a leeward side of the indoor condenser 4) calculated from a target outlet temperature TAO, controls the number of revolutions of the compressor 2 on the basis of the target indoor condenser pressure PCO, and the refrigerant pressure of the indoor condenser 4 (the indoor condenser pressure Pci. A high pressure in the refrigerant circuit R) detected by the indoor condenser pressure sensor 47, and controls the valve opening position of the outdoor expansion valve 6 on the basis of the temperature of the indoor condenser 4 (the indoor condenser temperature TCI) detected by the indoor condenser temperature sensor 46 and the indoor condenser pressure Pci detected by the indoor condenser pressure sensor 47 to control the subcooling degree of the refrigerant at the outlet of the indoor condenser 4. The target heater temperature TCO is basically TCO=TAO. However, a given restriction is placed on the control. Moreover, if the heating capacity based on the indoor condenser 4 is insufficient, the auxiliary heater 23 is energized to generate heat, thereby assisting (complementing) the heating capacity.

(2) Combined Heating Mode (Waste Heat Recovery Parallel Mode)

Figure 4:
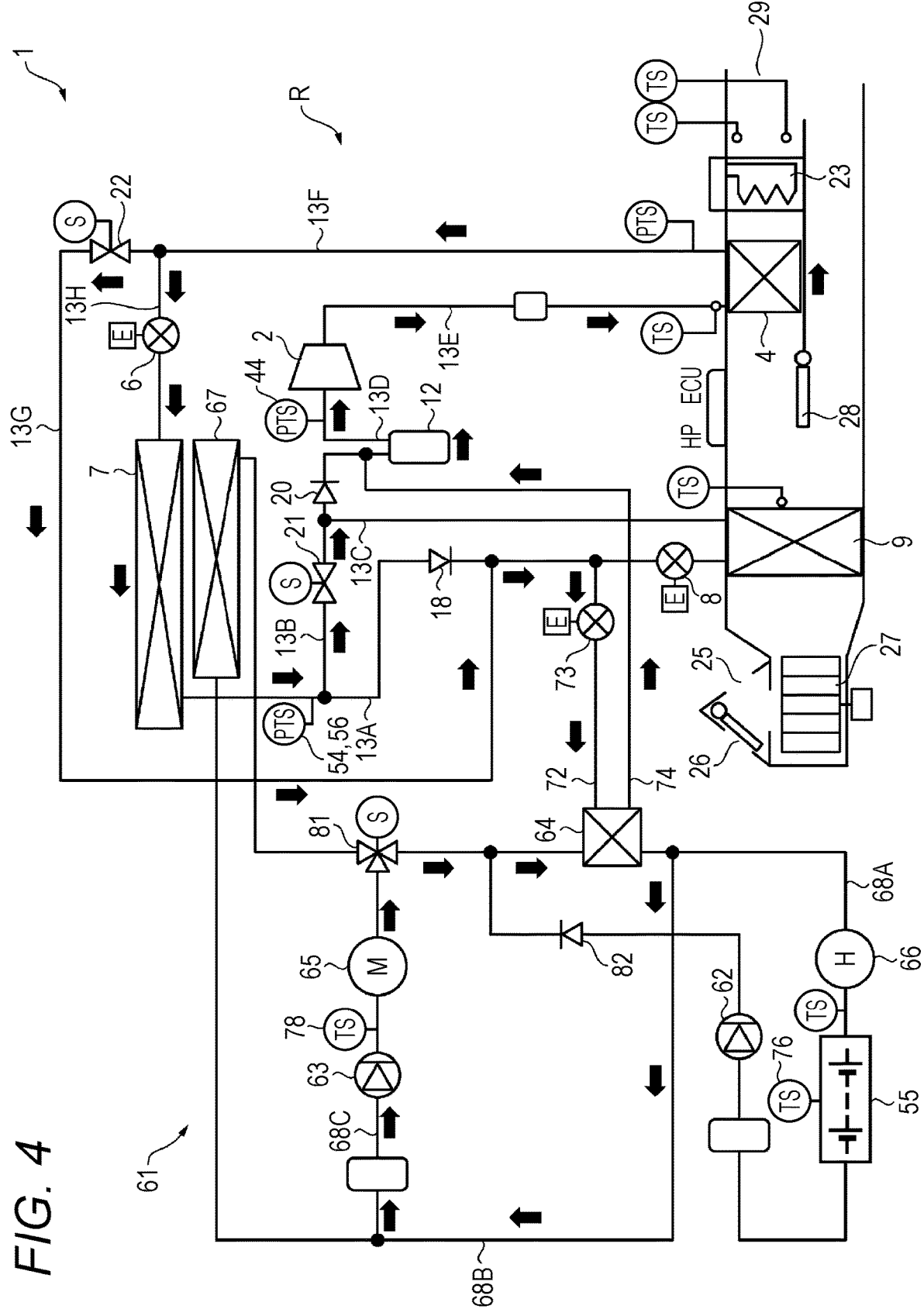
FIG. 4 is an explanatory diagram illustrating the flow of the refrigerant during heating operation in a combined heating mode in the vehicle air-conditioning apparatus according to the embodiment of the present invention.

FIG. 4 illustrates the flows of the refrigerant in the refrigerant circuit R and the flow of the heating medium in the device temperature adjustment circuit 61 in the combined heating mode. In the combined heating mode, the air-conditioning controller 32 also opens the solenoid valve 22 and the chiller expansion valve 73 to enable control of their valve opening positions in the refrigerant circuit R illustrated in FIG. 3 in the outside air heat absorption heating mode in the heating operation. Consequently, a part of the refrigerant that has exited from the indoor condenser 4 is branched on the refrigerant upstream side of the outdoor expansion valve 6, and flows into the refrigerant pipe 13A through the refrigerant pipe 13G.

The refrigerant that has flowed into the refrigerant pipe 13A enters the branch pipe 72, is decompressed by the chiller expansion valve 73, then flows into the refrigerant flow path of the chiller heat exchanger 64 through the branch pipe 72, and evaporates. At this point in time, an endothermic effect is exerted. The refrigerant that has evaporated in the refrigerant flow path enters the downstream side of the check valve 20 of the refrigerant pipe 13B through the refrigerant pipe 74, and is sucked into the compressor 2 through the accumulator 12 and the refrigerant pipe 13D. This circulation is repeated.

On the other hand, as illustrated in FIG. 4, the heating medium in the device temperature adjustment circuit 61 is discharged from the second circulation pump 63 to a heating medium pipe 68C, reaches the motor unit 65, exchanges heat with the motor unit 65, and then reaches the heating medium flow path of the chiller heat exchanger 64 through the three-way valve 81. The refrigerant evaporating in the refrigerant flow path of the chiller heat exchanger 64 absorbs heat from the heating medium to cool the heating medium. The heating medium that has been cooled by the endothermic effect of the refrigerant exits from the chiller heat exchanger 64, and is sucked into the second circulation pump 63. This circulation is repeated.

In this manner, in the combined heating mode, the outdoor heat exchanger 7 and the chiller heat exchanger 64 are connected in parallel to the flow of the refrigerant in the refrigerant circuit R; therefore, the refrigerant flows into the outdoor heat exchanger 7 and the chiller heat exchanger 64 and evaporates in each of them. Therefore, the outdoor heat exchanger 7 absorbs heat from the outside air, and the chiller heat exchanger 4 also absorbs heat from the heating medium (the motor unit 65). Consequently, heat is pumped from the motor unit 65 (the temperature control target) through the heating medium, and the pumped heat is transferred to the indoor condenser 64 while the motor unit 65 is cooled; therefore, the heat can be used to heat the vehicle interior.

(3) Temperature Control Target Heat Absorption Heating Mode (Waste Heat Recovery Single Mode)

Figure 5:
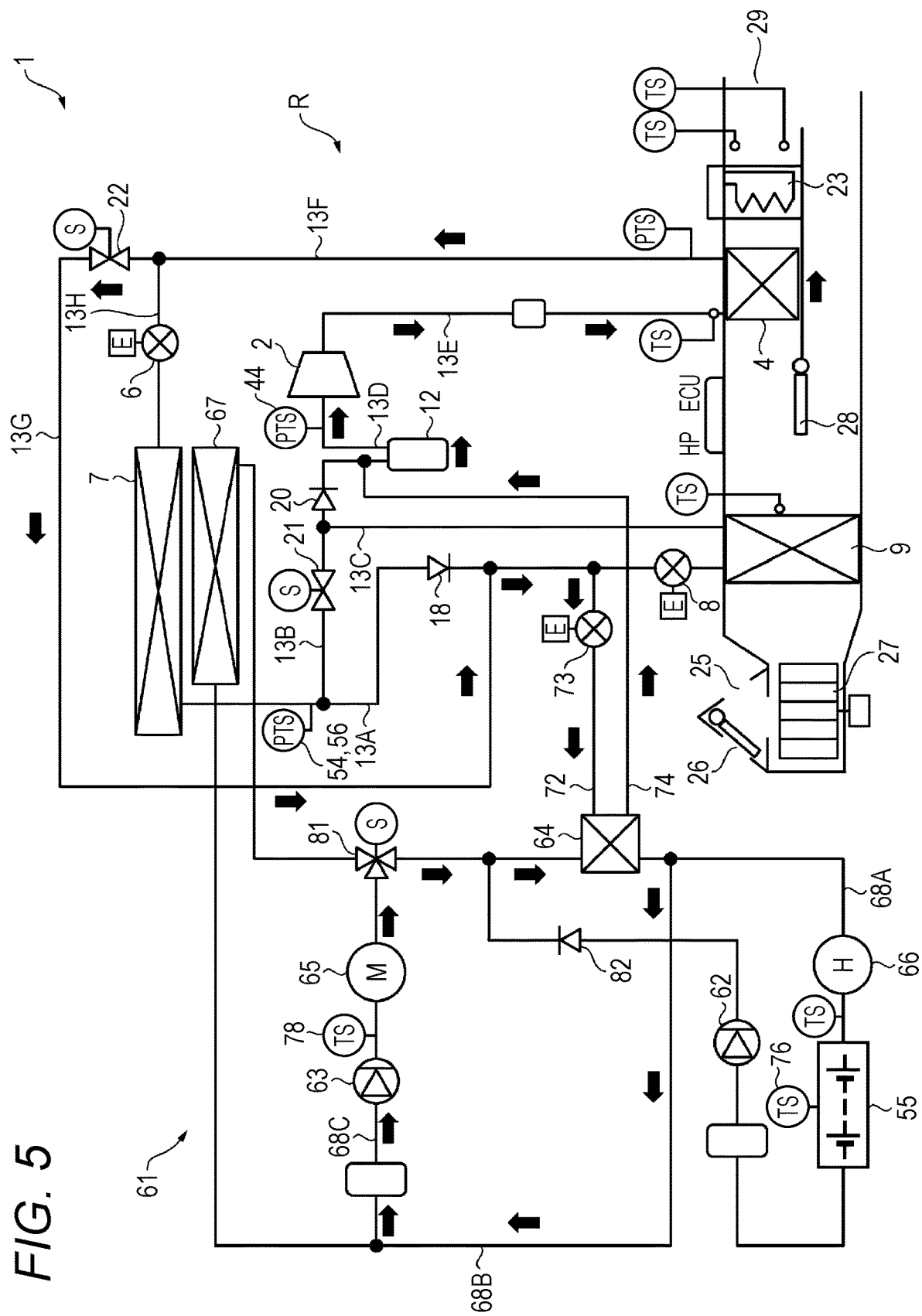
FIG. 5 is an explanatory diagram illustrating the flow of the refrigerant during heating operation in a temperature control target heat absorption heating mode in the vehicle air-conditioning apparatus according to the embodiment of the present invention.

FIG. 5 illustrates the flow of the refrigerant in the refrigerant circuit R and the flow of the heating medium in the device temperature adjustment circuit 61 in the temperature control target heat absorption heating mode.

In the temperature control target heating mode, the air-conditioning controller 32 closes the solenoid valve 21 (which may be open since there is the check valve 20) and fully closes the outdoor expansion valve 6 and the indoor expansion valve 8, and opens the solenoid valve 22 and also opens the chiller expansion valve 73 to enable control of their valve opening positions. The compressor 2 and the indoor fan 27 are operated (the heating medium heater 66 is not energized).

Consequently, all the refrigerant that has flowed out of the indoor condenser 4 flows into the solenoid valve 22, and flows into the refrigerant pipe 13A through the refrigerant pipe 13G. Thereafter, the refrigerant flows into the branch pipe 72, is decompressed by the chiller expansion valve 73, and then flows into the refrigerant flow path of the chiller heat exchanger 64 to evaporate. At this point in time, an endothermic effect is exerted. The refrigerant that has evaporated in the refrigerant flow path flows into the downstream side of the check valve 20 of the refrigerant pipe 13B through the refrigerant pipe 74, and is sucked into the compressor 2 through the accumulator 12 and the refrigerant pipe 13D. This circulation is repeated.

On the other hand, as illustrated in FIG. 5, the heating medium in the device temperature adjustment circuit 61 is discharged from the second circulation pump 63 to the heating medium pipe 68C, reaches the motor unit 65, exchanges heat with the motor unit 65, and then reaches the heating medium flow path of the chiller heat exchanger 64 through the three-way valve 81. The refrigerant evaporating in the refrigerant flow path of the chiller heat exchanger 64 absorbs heat from the heating medium to cool the heating medium. The heating medium that has been cooled by the endothermic effect of the refrigerant exits from the chiller heat exchanger 64, and is sucked into the second circulation pump 63. This circulation is repeated.

In this manner, in the waste heat recovery single mode, the refrigerant in the refrigerant circuit R evaporates in the chiller heat exchanger 64, and heat is absorbed only from the heating medium in the device temperature adjustment circuit 61. In other words, the refrigerant does not flow into the outdoor heat exchanger 7 and does not evaporate therein, and the refrigerant pumps heat only from the motor unit 65 through the heating medium. Therefore, while a problem of frost formed on the outdoor heat exchanger 7 is solved, the motor unit 65 is cooled, and the heat pumped from the motor unit 65 (the temperature control target) is transferred to the indoor condenser 4. As a result, the vehicle interior can be heated.

(4) Mode Switching During Heating Operation

The air-conditioning controller 32 switches between the heating modes, for example, in the following cases:

When the vehicle air-conditioning apparatus 1 is operating in the normal heating mode, if a sufficient amount of waste heat can be recovered from the motor unit 65 (the temperature Tw of the heating medium (cooling water) entering the motor unit 65>30 deg, and waste heat recovery requested), the normal heating mode is transitioned to the waste heat recovery parallel mode.

If the waste heat cannot be recovered (Tw<−5 deg, or Tw<temperature Tam of the air outside the vehicle, or no waste heat recovery request) during operation in the waste heat recovery parallel mode, the air-conditioning controller 32 judges that the waste heat recovery is complete, and switches from the waste heat recovery parallel mode to the normal heating mode. If the water temperature continues to increase (Tw>60 deg and the waste heat recovery requested) during operation in the waste heat recovery parallel mode, the waste heat recovery parallel mode is switched to the waste heat recovery single mode.

At the time of switching from the waste heat recovery parallel mode or the waste heat recovery single mode to the normal heating mode, it is necessary to fully close the chiller expansion valve 73 to stop the circulation of the refrigerant to the chiller heat exchanger 64. Moreover, at the time of switching from the waste heat recovery single mode to the normal heating mode, it is necessary to increase the degree of opening of the outdoor expansion valve 6 in order to circulate the refrigerant to the outdoor heat exchanger 7.

Control over the outdoor expansion valve 6 and the chiller expansion valve 73 at the time of switching from the waste heat recovery parallel mode to the normal heating mode is described below with reference to graphs illustrated in FIGS. 6(A) and 6(B) and a flowchart of FIG. 7.

Figure 6:
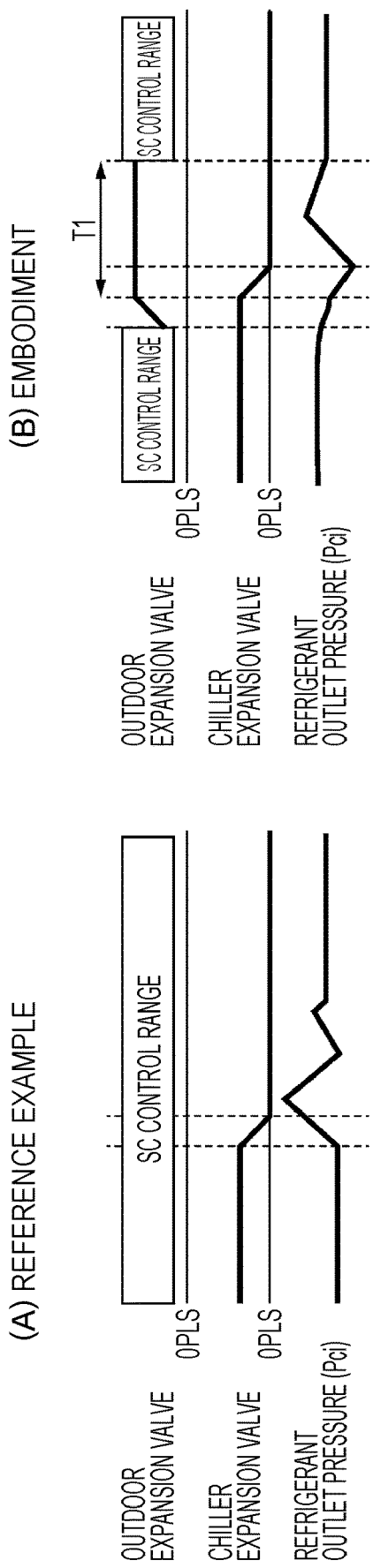
FIGS. 6(A) and 6(B) are graphs illustrating changes in the number of pulses transmitted to a pulse motor of an outdoor expansion valve 6, the number of pulses transmitted to a pulse motor of a chiller expansion valve 73, and a refrigerant outlet pressure Pci of an indoor condenser at the time of switching from a waste heat recovery parallel mode to a normal heating mode in a vehicle air-conditioning apparatus according to a reference example, and in the vehicle air-conditioning apparatus according to the embodiment, respectively.

FIGS. 6(A) and 6(B) are graphs illustrating changes in the number of pulses transmitted to the pulse motor of the outdoor expansion valve 6, the number of pulses transmitted to the pulse motor of the chiller expansion valve 73, and the refrigerant outlet pressure Pci of the indoor condenser 4 at the time of switching from the waste heat recovery parallel mode to the normal heating mode in a vehicle air-conditioning apparatus according to a reference example, and in the vehicle air-conditioning apparatus according to the embodiment, respectively.

Figure 7:
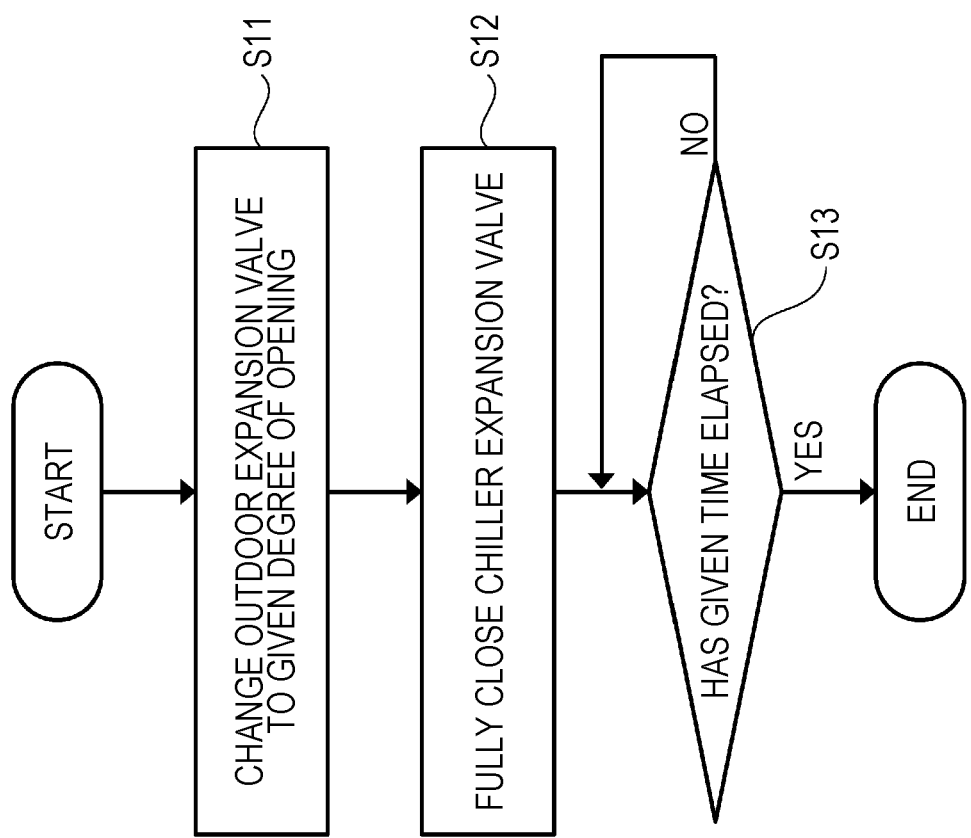
FIG. 7 is a flowchart illustrating the flow of control over the outdoor expansion valve and the chiller expansion valve in the vehicle air-conditioning apparatus according to the embodiment of the present invention.

FIG. 7 is a flowchart illustrating the flow of the control over the outdoor expansion valve 6 and the chiller expansion valve 73 in the vehicle air-conditioning apparatus 1 illustrated in FIG. 6(B).

In the vehicle air-conditioning apparatus according to the reference example of FIG. 6(A), at the timing when a condition of switching from the waste heat recovery parallel mode to the normal heating mode is satisfied, the air-conditioning controller 32 sets, at zero, the number of pulses transmitted to the pulse motor of the chiller expansion valve 73, and fully closes the chiller expansion valve 73 immediately. On the other hand, the outdoor expansion valve 6 remains under SC control of the air-conditioning controller 32.

As illustrated in FIG. 6(A), when the chiller expansion valve 73 is fully closed immediately, the refrigerant outlet pressure Pci of the indoor condenser 4 increases suddenly and temporarily. Moreover, in step with this, the SC value of the indoor condenser 4 also increases suddenly and temporarily, which may cause a burden on the compressor.

Therefore, as illustrated in FIG. 6(B), in the embodiment, the air-conditioning controller 32 temporarily releases the SC control over the outdoor expansion valve 6 at the timing when the condition of switching from the waste heat recovery parallel mode to the normal heating mode is satisfied, and increases the degree of opening of the outdoor expansion valve 6 to a predetermined degree of opening Vohx1 (step S11 of FIG. 7). Thereafter, the air-conditioning controller 32 fully closes the chiller expansion valve 73 while maintaining the degree of opening Vohx1 of the outdoor expansion valve 6 (step S12 of FIG. 7). The air-conditioning controller 32 returns the outdoor expansion valve 6 to under the SC control after a lapse of a given time T1 since the outdoor expansion valve 6 is increased to the degree of opening Vohx1 (step S13 of FIG. 7).

When the outdoor expansion valve 6 starts being driven to reach the degree of opening Vohx1 that is a target degree of opening, the refrigerant outlet pressure Pci of the indoor condenser 4 starts decreasing gradually. When the degree of opening of the outdoor expansion valve 6 reaches the degree of opening Vohx1, the number of pulses transmitted to the pulse motor of the chiller expansion valve 73 becomes zero, and the chiller expansion valve 73 starts being driven to be fully closed, the refrigerant outlet pressure Pci decreases further. When the chiller expansion valve 73 is fully closed, the refrigerant outlet pressure Pci increases and then decreases slightly again. Thereafter, the outdoor expansion valve 6 transitions to under the SC control, and the refrigerant outlet pressure Pci is stabilized at a given pressure.

Figure 8:
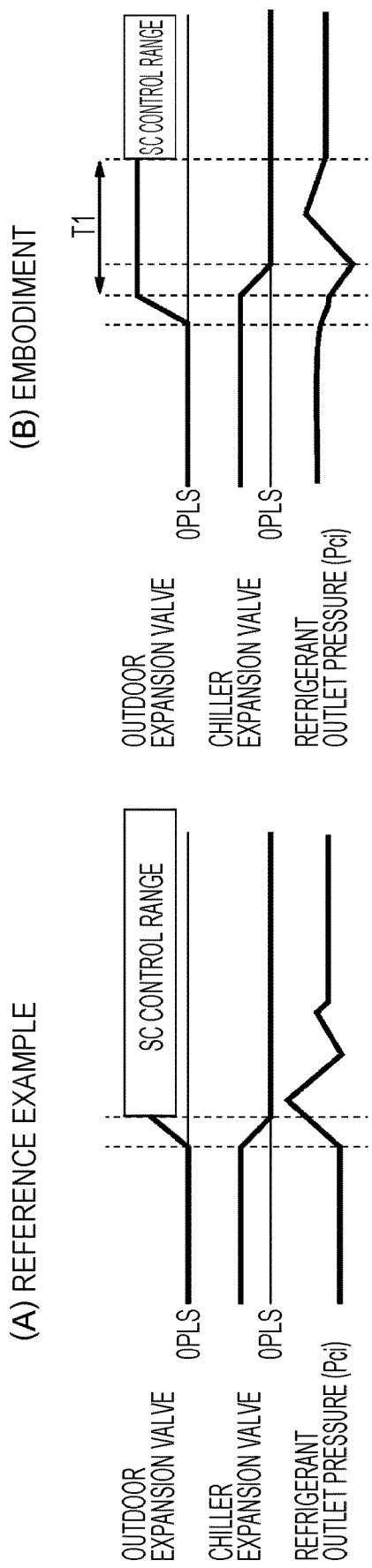
FIGS. 8(A) and 8(B) are graphs illustrating changes in the number of pulses transmitted to the pulse motor of the outdoor expansion valve, the number of pulses transmitted to the pulse motor of the chiller expansion valve, and the refrigerant outlet pressure Pci of the indoor condenser at the time of switching from a waste heat recovery single mode to the normal heating mode in the vehicle air-conditioning apparatus according to a reference example, and in the vehicle air-conditioning apparatus according to the embodiment, respectively.

Next, control over the outdoor expansion valve 6 and the chiller expansion valve 73 at the time of switching from the waste heat recovery single mode to the normal heating mode is described with reference to FIGS. 8(A) and 8(B). FIGS. 8(A) and 8(B) are graphs illustrating changes in the number of pulses transmitted to the pulse motor of the outdoor expansion valve 6, the number of pulses transmitted to the pulse motor of the chiller expansion valve 73, and the refrigerant outlet pressure Pci of the indoor condenser 4 at the time of switching from the waste heat recovery single mode to the normal heating mode in the vehicle air-conditioning apparatus according to a reference example, and in the vehicle air-conditioning apparatus according to the embodiment, respectively. Note that the flowchart of FIG. 7 is referred to for the flow of the control over the outdoor expansion valve 6 and the chiller expansion valve 73 in the vehicle air-conditioning apparatus 1 illustrated in FIG. 8(B).

In the vehicle air-conditioning apparatus according to the reference example of FIG. 8(A), at the timing when a condition of switching from the waste heat recovery single mode to the normal heating mode is satisfied, the air-conditioning controller 32 sets, at zero, the number of pulses transmitted to the pulse motor of the chiller expansion valve 73, and fully closes the chiller expansion valve 73 immediately. On the other hand, the outdoor expansion valve 6 transitions from the fully closed state to under the SC control. As illustrated in FIG. 8(A), in the case of the reference example, when the chiller expansion valve 73 is fully closed immediately as in FIG. 6(A) also at the time of switching from the waste heat recovery single mode to the normal heating mode, the refrigerant outlet pressure Pci of the indoor condenser 4 results in increasing suddenly and temporarily.

Therefore, as illustrated in FIG. 8(B), in the embodiment, the air-conditioning controller 32 increases the degree of opening of the outdoor expansion valve 6 to the predetermined degree of opening Vohx1 at the timing when the condition of switching from the waste heat recovery single mode to the normal heating mode is satisfied (step S11 of FIG. 7). Thereafter, the air-conditioning controller 32 fully closes the chiller expansion valve 73 while maintaining the degree of opening Vohx1 of the outdoor expansion valve 6 (step S12 of FIG. 7). The air-conditioning controller 32 causes the outdoor expansion valve 6 to transition to under the SC control after a lapse of the given time T1 from the change to the degree of opening Vohx1.

When the outdoor expansion valve 6 starts being driven to reach the degree of opening Vohx1 that is a target degree of opening, the refrigerant outlet pressure Pci of the indoor condenser 4 starts decreasing gradually. When the outdoor expansion valve 6 reaches the degree of opening Vohx1, the number of pulses transmitted to the pulse motor of the chiller expansion valve 73 becomes zero, and the chiller expansion valve 73 starts being driven to be fully closed, the refrigerant outlet pressure Pci decreases further. When the chiller expansion valve 73 is fully closed, the refrigerant outlet pressure Pci increases and then decreases slightly again. Thereafter, the outdoor expansion valve 6 transitions to under the SC control, and the refrigerant outlet pressure Pci is stabilized at a given pressure.

Note that the predetermined degree of opening Vohx1 of the outdoor expansion valve 6 is a degree of opening greater than the degree of opening immediately before the waste heat recovery parallel mode or the waste heat recovery single mode is switched to the normal heating mode, and is a degree of opening at which the refrigerant outlet pressure Pci of the indoor condenser 4 can be temporarily lowered (the refrigerant outlet pressure Pci of the indoor condenser 4 can be lowered in advance by the temporary sudden increase in the reference example). The degree of opening Vohx1 of the outdoor expansion valve 6 is preferably, for example, approximately equal to the maintained degree of opening when the heating operation is started, and specifically, a degree of opening corresponding to a number of pulses of 130 PLS is preferable.

Moreover, the given time T1 that elapses since the outdoor expansion valve 6 is changed to the degree of opening Vohx1 is the time taken for the refrigerant outlet pressure Pci of the indoor condenser 4 to reach a pressure approximately equal to the pressure immediately before the waste heat recovery parallel mode is switched to the normal heating mode, and is predetermined. The given time T1 is preferably, for example, approximately equal to the time during which the outdoor expansion valve 6 is maintained at the given degree of opening when the heating operation is started, and specifically, approximately 30 seconds are preferable.

(Modification)

Next, a modification of the above-mentioned embodiment is described. In the modification, at the time of switching from the waste heat recovery parallel mode or the waste heat recovery single mode to the normal heating mode, the air-conditioning controller 32 changes the outdoor expansion valve 6 to a given degree of opening Vohx2, monitors the refrigerant outlet pressure Pci while maintaining the degree of opening Vohx2 for a given time T2, and controls the chiller expansion valve 73 in such a manner as to decrease its degree of opening in stages to be fully closed.

The modification is described below with reference to the drawings.

Figure 9:
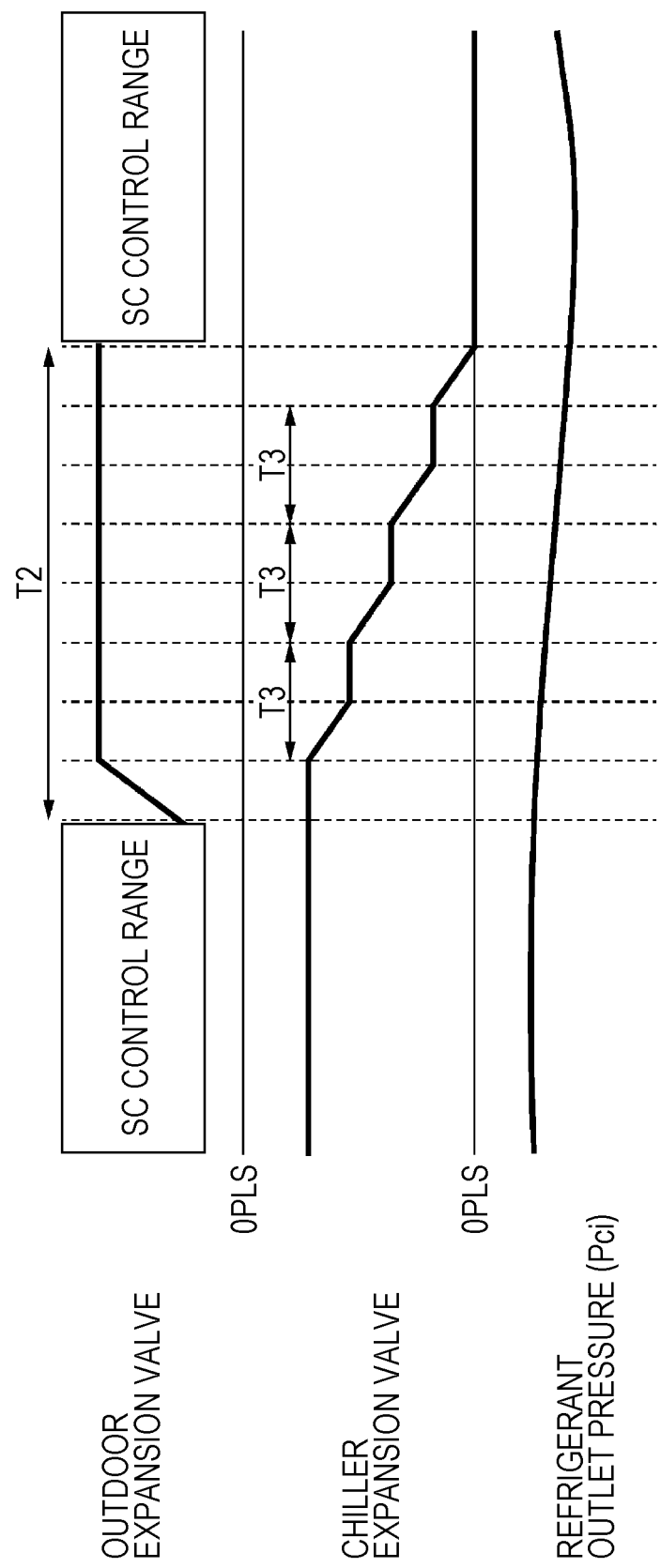
FIG. 9 is a graph illustrating changes in the number of pulses transmitted to the pulse motor of the outdoor expansion valve, the number of pulses transmitted to the pulse motor of the chiller expansion valve, and the refrigerant outlet pressure Pci of the indoor condenser at the time of switching from the waste heat recovery parallel mode to the normal heating mode in the vehicle air-conditioning apparatus according to a modification of the embodiment of the present invention.
Figure 10:
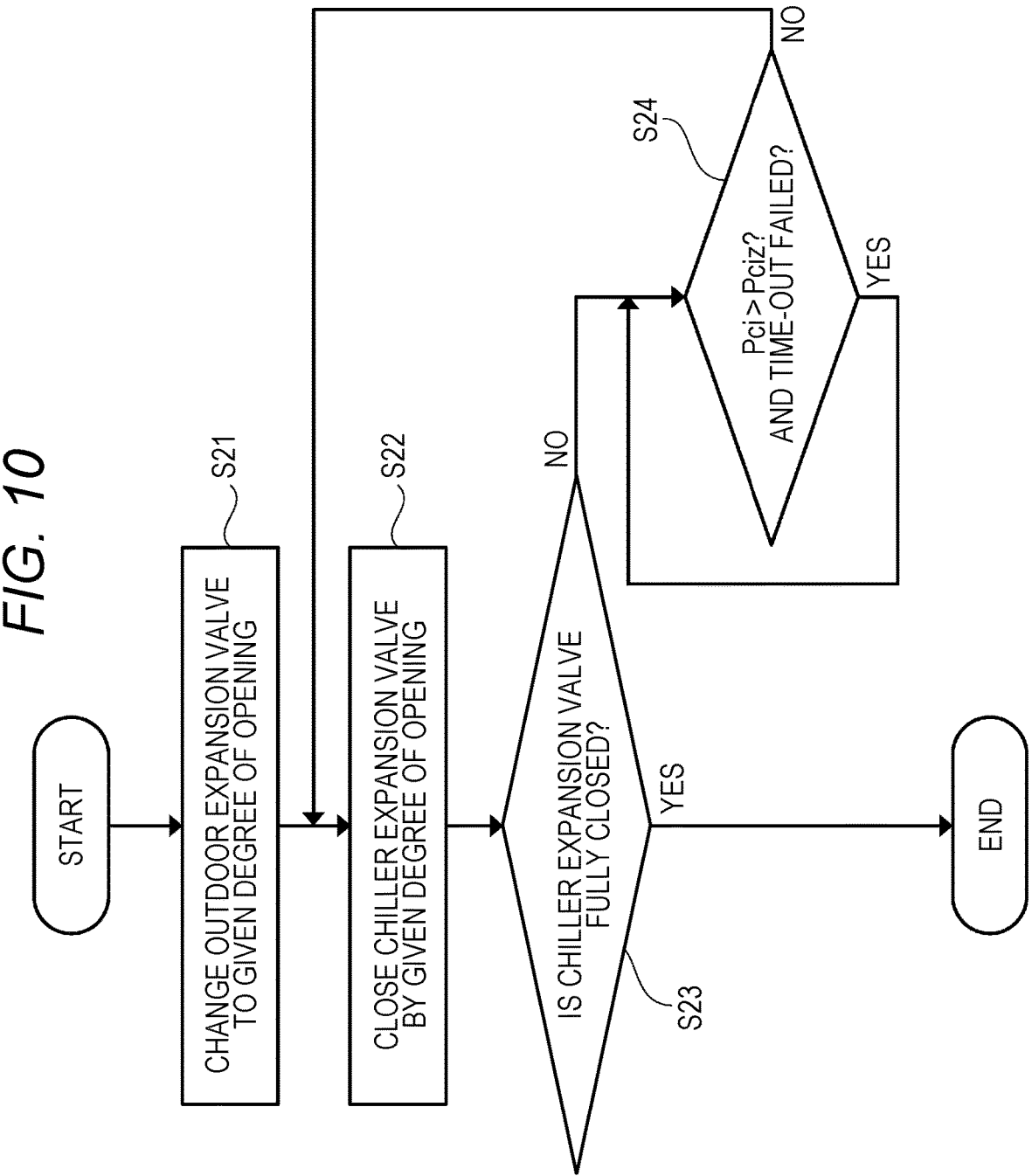
FIG. 10 is a flowchart illustrating the flow of the control over the outdoor expansion valve and the chiller expansion valve in the vehicle air-conditioning apparatus according to the modification of the embodiment of the present invention.

FIG. 9 is a graph illustrating changes in the number of pulses transmitted to the pulse motor of the outdoor expansion valve 6, the number of pulses transmitted to the pulse motor of the chiller expansion valve 73, and the refrigerant outlet pressure Pci of the indoor condenser 4 at the time of switching from the waste heat recovery parallel mode to the normal heating mode in the vehicle air-conditioning apparatus 1 according to the modification. FIG. 10 is a flowchart illustrating the flow of the control over the outdoor expansion valve 6 and the chiller expansion valve 73 in the vehicle air-conditioning apparatus 1 illustrated in FIG. 9.

As illustrated in FIG. 9, at the timing when the condition of switching from the waste heat recovery parallel mode to the normal heating mode is satisfied, the air-conditioning controller 32 temporarily releases the SC control over the outdoor expansion valve 6, increases the degree of opening of the outdoor expansion valve 6 to the predetermined degree of opening Vohx2, and maintains the degree of opening Vohx2 (step S21 of FIG. 10). Thereafter, the air-conditioning controller 32 decreases the degree of opening of the chiller expansion valve 73 by a given degree of opening Vx (step S22 of FIG. 10), and monitors the refrigerant outlet pressure Pci. In other words, in step with the decrease in the degree of opening of the chiller expansion valve 73, the air-conditioning controller 32 periodically receives the refrigerant outlet pressure Pci of the indoor condenser 4 from the indoor condenser pressure sensor 47 at given time intervals, and monitors fluctuations in the refrigerant outlet pressure Pci.

When the latest refrigerant outlet pressure Pci has decreased as compared to a previously received refrigerant outlet pressure Pciz, and a given time T3 has elapsed, the air-conditioning controller 32 decreases the degree of opening of the chiller expansion valve 73 further by the given degree of opening Vx (steps S24 and S22 of FIG. 10). This process is repeated until the chiller expansion valve 73 is fully closed (step S23 of FIG. 10). After the chiller expansion valve 73 is fully closed or the given time T2 (for example, 10 seconds) elapses since the outdoor expansion valve 6 is changed to the predetermined degree of opening Vohx2, the outdoor expansion valve 6 is returned to under the SC control.

When the outdoor expansion valve 6 is opened at the degree of opening Vohx2 and the chiller expansion valve 73 is closed by the predetermined degree of opening Vx, the refrigerant outlet pressure Pci fluctuates little by little. Closing the chiller expansion valve 73 at every degree of opening Vx in stages while maintaining the outdoor expansion valve 6 at the degree of opening Vohx2 makes it possible to switch from the waste heat recovery parallel mode to the normal heating mode without significant fluctuations in the refrigerant outlet pressure Pci.

Figure 11:
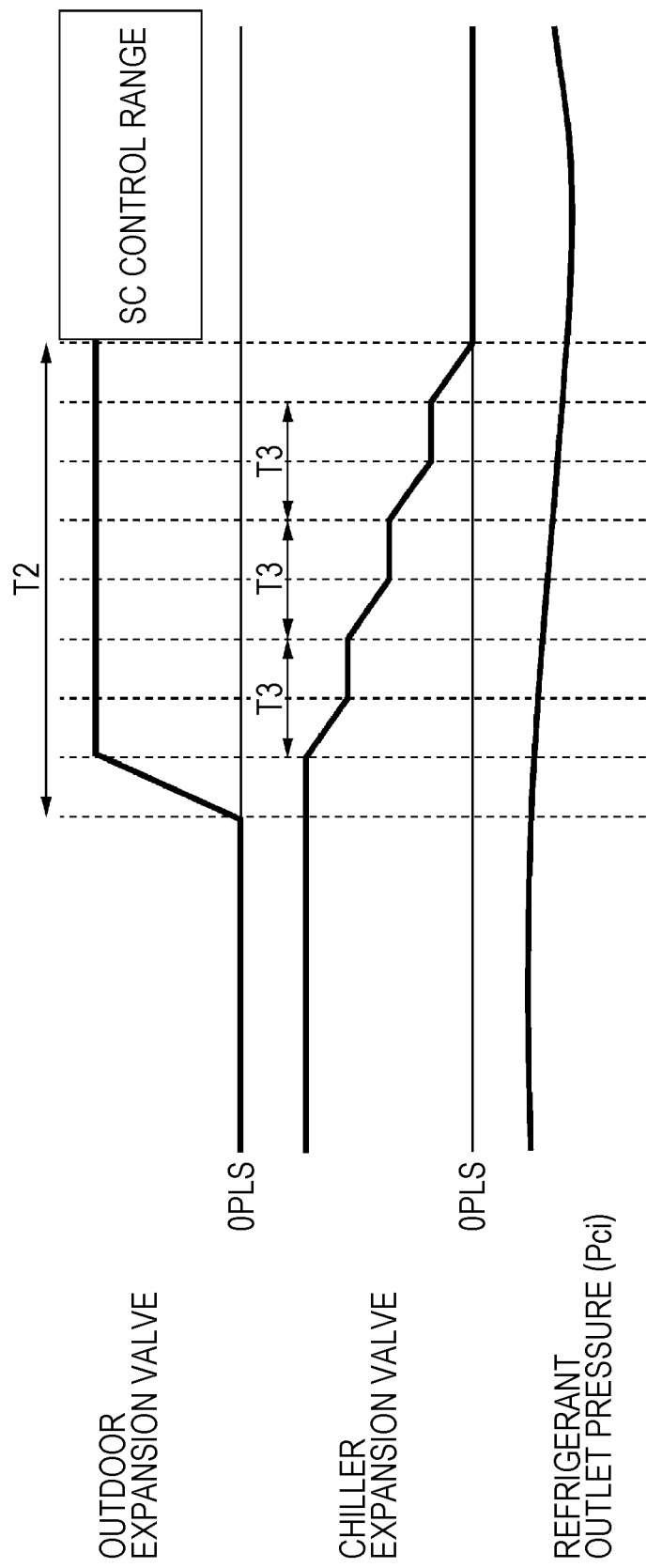
FIG. 11 is a graph illustrating changes in the number of pulses transmitted to the pulse motor of the outdoor expansion valve, the number of pulses transmitted to the pulse motor of the chiller expansion valve, and the refrigerant outlet pressure Pci of the indoor condenser at the time of switching from the waste heat recovery single mode to the normal heating mode in the vehicle air-conditioning apparatus according to the modification of the embodiment of the present invention.

Next, the control over the outdoor expansion valve 6 and the chiller expansion valve 73 at the time of switching from the waste heat recovery single mode to the normal heating mode is described with reference to FIG. 11. FIG. 11 is a graph illustrating changes in the number of pulses transmitted to the pulse motor of the outdoor expansion valve 6, the number of pulses transmitted to the pulse motor of the chiller expansion valve 73, and the refrigerant outlet pressure Pci of the indoor condenser 4 at the time of switching from the waste heat recovery single mode to the normal heating mode in the vehicle air-conditioning apparatus 1. Note that the flowchart of FIG. 10 is referred to for the flow of the control over the outdoor expansion valve 6 and the chiller expansion valve 73 in the vehicle air-conditioning apparatus 1 illustrated in FIG. 11.

As illustrated in FIG. 11, in the modification, at the timing when the condition of switching from the waste heat recovery single mode to the normal heating mode is satisfied, the air-conditioning controller 32 opens the outdoor expansion valve 6 at the predetermined degree of opening Vohx2 and maintains the degree of opening Vohx2 (step S21 of FIG. 10). Thereafter, the air-conditioning controller 32 closes the chiller expansion valve 73 by the given degree of opening Vx (step S22 of FIG. 10), and monitors the refrigerant outlet pressure Pci. In other words, in step with the change in the degree of opening of the chiller expansion valve 73, the air-conditioning controller 32 receives the refrigerant outlet pressure Pci of the indoor condenser 4 from the indoor condenser pressure sensor 47 at given time intervals, and monitors fluctuations in the refrigerant outlet pressure Pci.

When the latest refrigerant outlet pressure Pci has decreased as compared to the previously received refrigerant outlet pressure Pciz, and the given time T3 has elapsed, the air-conditioning controller 32 closes the chiller expansion valve 73 further by the given degree of opening Vx (steps S24 and S22 of FIG. 10). This process is repeated until the chiller expansion valve 73 is fully closed (step S23 of FIG. 10). After the chiller expansion valve 73 is fully closed or the given time T2 elapses since the outdoor expansion valve 6 is changed to the predetermined degree of opening Vohx2, the outdoor expansion valve 6 is caused to transition to under the SC control.

In this manner, when the outdoor expansion valve 6 is opened at the degree of opening Vohx2 and the chiller expansion valve 73 is closed by the predetermined degree of opening Vx, the refrigerant outlet pressure Pci fluctuates little by little. Closing the chiller expansion valve 73 at every degree of opening Vx in stages while maintaining the outdoor expansion valve 6 at the degree of opening Vohx2 makes it possible to switch from the waste heat recovery single mode to the normal heating mode without significant fluctuations in the refrigerant outlet pressure Pci.

Note that the predetermined degree of opening Vohx2 of the outdoor expansion valve 6 is a degree of opening greater than the degree of opening immediately before the waste heat recovery parallel mode or the waste heat recovery single mode is switched to the normal heating mode, and is a degree of opening at which the refrigerant outlet pressure Pci does not fluctuate significantly when the chiller expansion valve 73 is closed in stages while the degree of opening Vohx2 of the outdoor expansion valve 6 is maintained. The degree of opening Vohx2 of the outdoor expansion valve 6 is preferably, for example, approximately equal to the maintained degree of opening when the heating operation is started, and specifically, a degree of opening corresponding to a number of pulses of 130 PLS is preferable.

Moreover, the predetermined degree of opening Vx of the chiller expansion valve 73 is a degree of opening at which the chiller expansion valve 73 is closed in stages at several times, and is a degree of opening at which the refrigerant outlet pressure Pci of the indoor condenser 4 does not fluctuate significantly even if the chiller expansion valve 73 is changed by the degree of opening Vx. The degree of opening Vx of the chiller expansion valve 73 is preferably, for example, approximately 10-20% of the degree of opening of the chiller expansion valve 73 during operation in the waste heat recovery parallel mode, and specifically, a degree of opening corresponding to a number of pulses of 20 PLS is preferable.

As described above, according to the vehicle air-conditioning apparatus 1 of the embodiment and the modification thereof, control is performed in such a manner that at the time of switching from the waste heat recovery parallel mode or the waste heat recovery single mode to the normal heating mode, the outdoor expansion valve provided to the refrigerant pipe leading to the outdoor heat exchanger 7 is opened at a given degree of opening, and the chiller expansion valve is fully closed while the open state of the outdoor expansion valve is maintained. In other words, since the flow path of the refrigerant toward the outdoor heat exchanger 7 is secured in advance, and then the flow path of the refrigerant toward the chiller heat exchanger is blocked, the refrigerant can be circulated without sudden changes in flow rate and pressure. Therefore, it is possible to prevent sudden increases in the refrigerant outlet pressure and the SC value of the indoor condenser 4, and it is possible to prevent a reduction in durability and failure of the compressor and to prevent deterioration in controllability of subcooling in the outdoor expansion valve 6.

Up to this point the embodiments of the present invention have been described in detail with reference to the drawings. However, the specific configuration is not limited to these embodiments, and, for example, modifications to the design within the scope that does not depart from the gist of the present invention are also included in the present invention.

LIST OF REFERENCE SIGNS

1 Vehicle air-conditioning apparatus
2 Compressor
4 Indoor condenser
6 Outdoor expansion valve (first electronic expansion valve)
7 Outdoor heat exchanger
8 Indoor expansion valve
9 Heat sink
32 Air-conditioning controller (control device)
44 Suction temperature sensor
54 Outdoor heat exchanger temperature sensor
56 Outdoor heat exchanger pressure sensor
61 Device temperature adjustment circuit
63 Second circulation pump
64 Chiller heat exchanger (refrigerant-heating medium heat exchanger)
65 Motor unit
73 Chiller expansion valve (second electronic expansion valve)

What is claimed is:

1. A vehicle air-conditioning apparatus comprising:
a refrigerant circuit including: a compressor configured to compress a refrigerant; a heating unit configured to heat blowing air to be blown into an air-conditioning target space; an outdoor heat exchanger configured to cause the refrigerant to absorb heat; a first electronic expansion valve provided on a refrigerant inlet side of the outdoor heat exchanger; a temperature control target heat exchanger; and a second electronic expansion valve provided on a refrigerant inlet side of the temperature control target heat exchanger;
a device temperature adjustment circuit connected to the refrigerant circuit via the temperature control target heat exchanger and configured to cause the temperature control target heat exchanger to adjust a temperature of a temperature control target mounted on a vehicle; and
a control device configured to control the refrigerant circuit and the device temperature adjustment circuit, wherein
in a heating operation for heating the interior of the vehicle by use of the heating unit, the control device is programmed to perform:
an outside air heat absorption heating mode in which the refrigerant that has been discharged from the compressor and has dissipated heat in the heating unit absorbs heat in the outdoor heat exchanger, and
a combined heating mode in which the refrigerant that has been discharged from the compressor and has dissipated heat in the heating unit absorbs heat in the outdoor heat exchanger and the temperature control target heat exchanger, and
upon switching from the combined heating mode to the outside air heat absorption heating mode, the control device is programmed to increase a degree of opening of the first electronic expansion valve to a given degree of opening, maintain the given degree of opening for a given period of time, and fully close the second electronic expansion valve within the given period of time.

2. The vehicle air-conditioning apparatus according to claim 1, wherein
the control device is further configured to perform a temperature control target heat absorption heating mode in which the refrigerant that has been discharged from the compressor and has dissipated heat in the heating unit absorbs heat in the temperature control target heat exchanger, and
upon switching from the temperature control target heat absorption heating mode to the outside air heat absorption heating mode, control is performed in such a manner that the degree of opening of the first electronic expansion valve is increased to the given degree of opening, the given degree of opening is maintained for a given period of time, and the second electronic expansion valve is fully closed within the given period of time.

3. The vehicle air-conditioning apparatus according to claim 1, wherein the control device controls the second electronic expansion valve in such a manner as to be fully closed by decreasing the degree of opening of the second expansion valve in stages within the given period of time.

4. The vehicle air-conditioning apparatus according to claim 3, wherein the control device periodically detects a refrigerant outlet pressure of the heating unit and, upon the detected refrigerant outlet pressure being lower than a previous detection result, decreases the degree of opening of the second electronic expansion valve in stages.

* * * * *